Jan. 14, 1947.  F. W. SCHWINN  2,414,275
FOLDING HANDLE BAR FOR BICYCLES
Original Filed Feb. 16, 1944   2 Sheets-Sheet 1

Inventor.
Frank W. Schwinn
By McCaleb, Wendt & Dickinson
attorneys

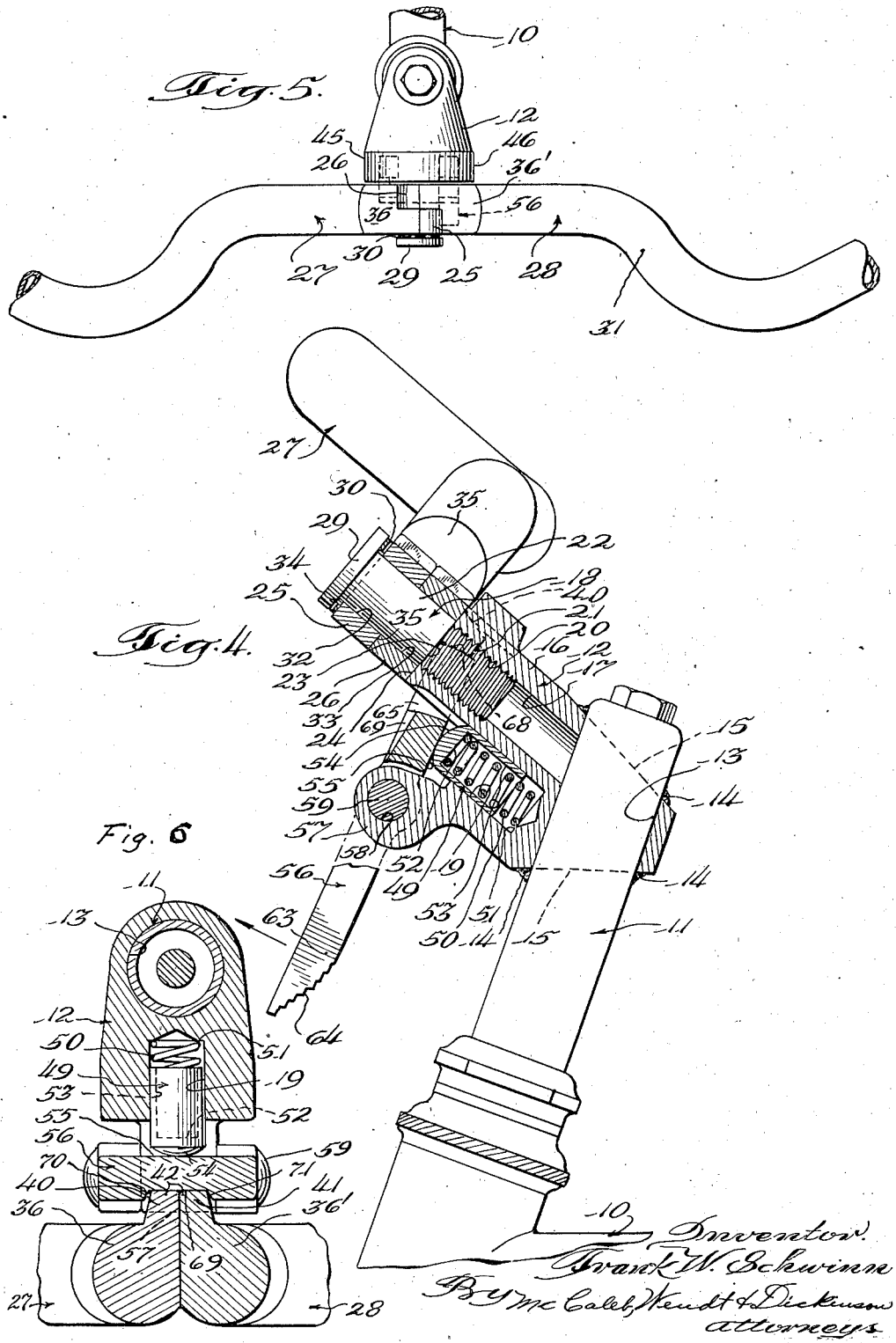

Patented Jan. 14, 1947

2,414,275

UNITED STATES PATENT OFFICE 2,414,275

FOLDING HANDLE BAR FOR BICYCLES

Frank W. Schwinn, Chicago, Ill.

Substituted for abandoned application Serial No. 522,577, February 16, 1944. This application November 27, 1946, Serial No. 712,531. In Great Britain July 3, 1944

12 Claims. (Cl. 74—551.4)

The present invention relates to folding handle bars for bicycles. While such folding handle bars may be employed upon any bicycle to advantage for making the assembly more compact at the forward end of the bicycle, the present handle bars are preferably mounted on a complete folding bicycle assembly of the type shown in my prior application, Ser. No. 526,179, filed March 13, 1944.

One of the objects of the present invention is the provision of an improved folding handle bar construction which consumes a minimum amount of time in the moving of the handle bars from the folded to the operative position, or vice versa.

Another object of the invention is the provision of an improved folding handle bar construction which is adapted to be free from rattling either in the folded or operative position, and which may be used for a long period of time without rattling being caused by wear of its parts.

Another object of the invention is the provision of an improved handle bar construction in which the handle bars are automatically locked in the operative position when the operator pulls the handle bars forcibly from their folded position.

Another object of the invention is the provision of an improved handle bar construction which is simple, sturdy, and adapted to be manufactured at a low cost and adapted to be used for a long period of time without rattling or loosening or necessity for repair or replacement of any of its parts.

Another object of the invention is the provision of an improved handle bar construction which is particularly adapted to be moved from the folded position to the operative position very speedily in total darkness, and in which there is no possibility of misalignment of any of the elements of the construction when so operated.

Other objects and advantages of the invention will be apparent from the following description and the accompanying drawings, in which similar characters of reference indicate similar parts throughout the several views.

Referring to the two sheets of drawings,

Fig. 4 is a fragmentary elevational view in partial section, showing the details of construction and mode of support of the handle bars;

Fig. 5 is a top plan view, showing the handle bars in the open or operative position;

Fig. 6 is a transverse sectional view, taken on the plane of the line 6—6 of Fig. 3, looking in the direction of the arrows, showing the arrangements for holding the handle bars in the folded position and for permitting them to be pulled into the operative position.

Referring to Figs. 1 to 3, 10 indicates the bicycle frame, which is provided with the usual steering post 11, having a handle bar extension 12. The handle bar extension 12 is provided with a through bore 13 for receiving the steering post 11, to which it may be welded as indicated at 14; and the extension 12 preferably extends upward and forward from the steering post 11 at an acute angle to the axis of the steering post.

Figure 2:
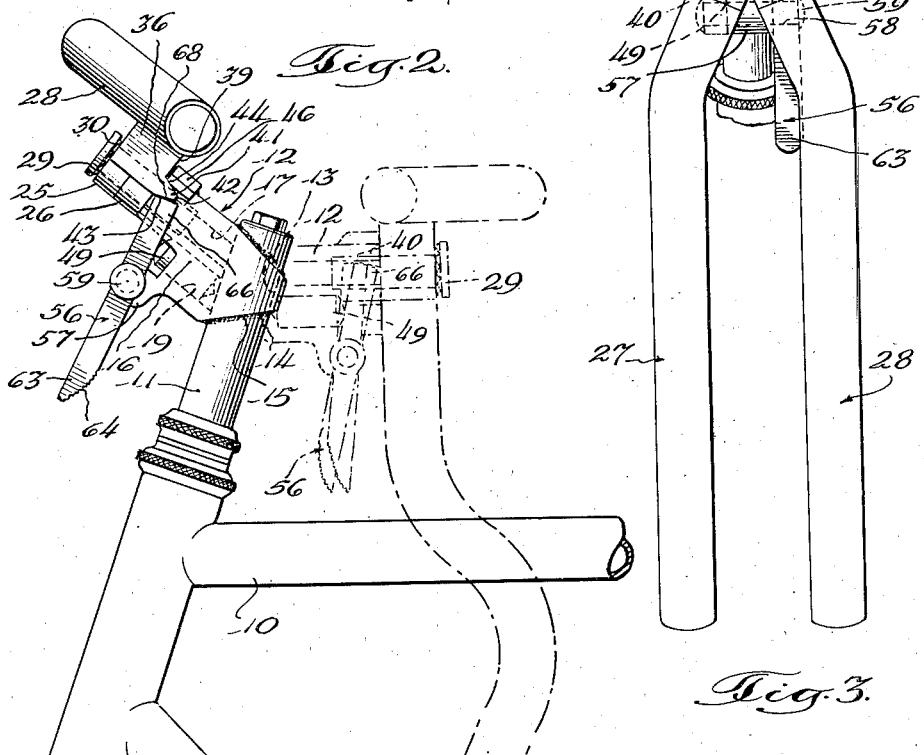
Fig. 2 is a fragmentary side elevational view, showing the handle bars in the same position as Fig. 1, with an alternative position of the handle bars, shown in dotted lines.
Figure 3:
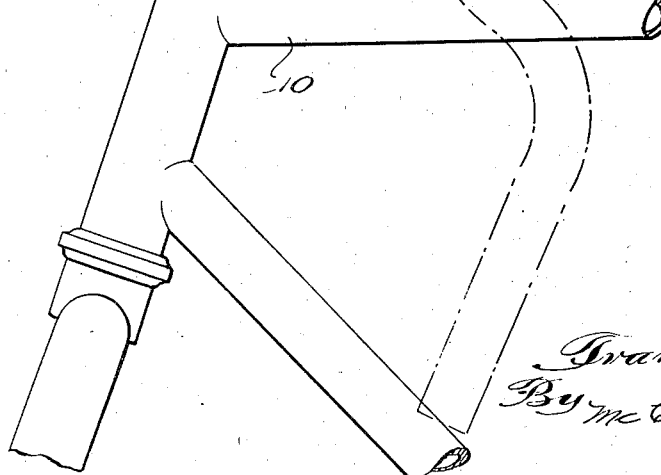
Fig. 3 is a fragmentary front elevational view, with the handle bars in the folded position.

In another adjustment of the steering post the extension 12 extends substantially horizontally and rearwardly, as shown in dotted lines in Fig. 2.

The handle bar extension member 12 may be substantially wedge-shaped at that portion 15 which has the bore 13 for receiving the steering post 11. It is provided with an enlarged forwardly extending body portion 16 of sufficient size to provide space for a bore 17 that receives the pivoted bolt 18 and for a plunger guide bore 19.

The bore 17 is suitably threaded at 20 to receive the threaded end 21 of the pivot bolt 18, which has a cylindrical body portion 22 for engaging the handle bars. Between the cylindrical body portion 22 and the threaded portion 21 on the bolt 18 there is an annular shoulder 23 which engages the plane end or face 24 of the handle bar extension 12. The bolt is driven home in its bore with the annular shoulder tightly engaging the face 24.

The length of the body portion 22 of the bolt 18 is slightly greater than the thickness of the two bearing portions 25, 26 on the handle bars 27, 28 so that there is space beneath the head 29 for the initially compressed spring washer 30, which is compressed to such a point that it takes up the clearance and resiliently engages the head 29 and handle bar bearing 25 to prevent rattling and to hold the handle bars in any position against inadvertent movement.

The handle bars 27, 28 are similar in construction except that they are made for right hand and left hand positions, and each includes a tubular body portion 31, which may be curved in any convenient manner, or the body portions may be straight. Each body portion 31 supports at its inner end a bearing portion 25, 26, and the bearing portions 25, 26 are substantially cylindrical extensions which are provided with the through bores 32, 33 and the plane upper and lower surfaces 34, 35.

The bearing portion 25 is disposed on the forward, that is, the left side, of the body 31 of the handle bar 27, while the bearing portion 26 is disposed on the rear, that is, the right side, of Fig. 4, of the handle bar member 28 so that when the bearing portions 25, 26 are assembled on the bolt 18 the handle bar bodies 31 are in alignment with each other.

The handle bars may be made up of tubular members 31 (Fig. 1), having a pressed fit upon a pair of cast metal fittings 36, 36', each of which supports one of the bearings 25, 26. The fittings have reduced tubular cylindrical portions 37, with an annular shoulder 38, against which the tubular bodies 31 may be driven when the reduced portion 37 is fitted in the end of the tubular body 31.

Figure 1:
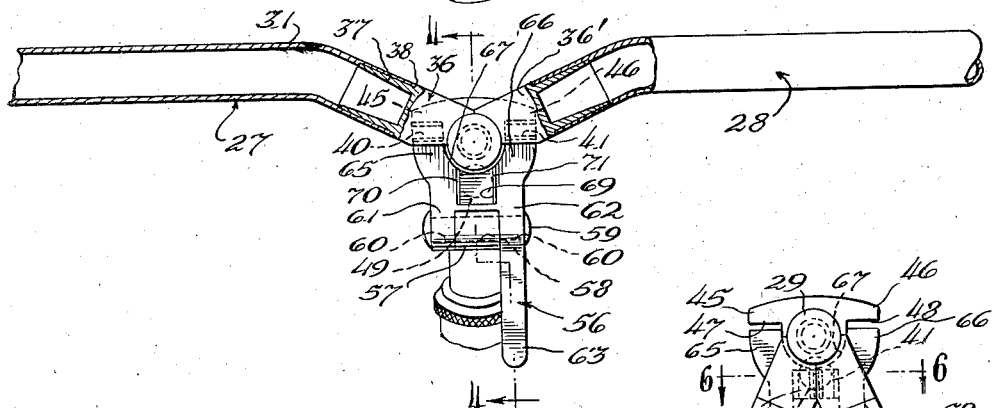
Fig. 1 is a fragmentary elevational view of a folding handle bar construction embodying the invention, with the handle bars in operative or unfolded position.

Each fitting 36, 36' is provided on its plane rear face 39 with a rearwardly projecting tapered lug or stop 40, 41, which has its apex or ridge 42 extending substantially horizontally when the handle bars are in the operative position of Fig. 1.

Each of the lugs or stops 41 also preferably has a pair of sloping sides 43, 44 and a plane apex 42, the latter being present due to the thickness of the lug 41. The handle bar extension 12 is also provided on its upper side with a pair of laterally projecting arms or lugs 45, 46, which may be of sufficient length to project laterally into engagement with the major portion of each lug 40, 41 on the handle bars.

The stop lugs 45, 46, have lower plane stop surfaces 47, 48, which are so inclined that they engage flatly with the sloping surfaces 44 on the lugs 40, 41 when the handle bars are in the position of Fig. 1. Stop surfaces 47, 48 definitely determine the uppermost position of the handle bars, since the upper sloping surfaces 44 on each stop lug 40, 41 of each handle bar comes into engagement with one of the surfaces 47, 48 when the handle bars are opened.

The stop portions 47, 48 on the handle bar extension 12 extend forwardly in Fig. 2 so as to be in position to engage the rigs or lugs 40, 41 on the handle bars, but the spaces below the stop lugs 45, 46 are free and open so as not to interfere with the downward movement of the lugs 40, 41 when the handle bars are pivoted downward on the bolt 18.

The body 16 of the handle bar extension 12 is also provided with the bore 19 located below the bore 17 and located centrally with respect to the lateral sides of the body 16 for receiving the plunger 49, which is spring pressed by means of a helical compression spring 50.

The plunger 49 may consist of a tubular metal member which receives and seats one end of the spring 50, the other end engaging the bottom 51 of the bore 19. By making the plunger 49 hollow the spring 50 may be made longer, and its opposite end engages the bottom 52 of the bore 53 in the plunger.

The outer end of the plunger 49 is preferably partially spherical, as indicated at 54, for engaging the rear plane face 55 of a latching lever 56, which the plunger urges into latching position.

The body portion 16 of the saddle bar extension 12 also has a downwardly and forwardly extending bearing portion 57 (Fig. 4) which is provided with the horizontal bore 58 for receiving the riveted pin 59 upon which the latching lever 56 is pivoted.

The pin 59 comprises a cylindrical metal member headed at one end and riveted at the other or spun over at both ends. The pin 59 is located in the cylindrical bores 60 in the two legs 61, 62 of the latching lever 56. One of the legs, such as leg 62 of this latching lever is made longer so as to provide an extension 63, serving for manual engagement.

The extension 63 preferably has its rear lower corner removed and provided with a serrated surface 64 for engagement with the fingers.

At its upper end the lever 56 is also preferably provided with a pair of upwardly extending legs 65, 66 separated by a curved recess 67 of sufficient size to embrace the round tubular portion 16 of the steering post extension 12.

The upper legs 65, 66 are each provided with partially cylindrical stop surfaces 68 formed on a radius which may be equal to the distance from this surface to the axis of the pin 59, but the center of rotation in generating the surfaces 68 is preferably displaced slightly toward the right of the axis of pin 59.

The lower beveled surfaces 43 on the lugs 40, 41 carried by the handle bar fixtures 36, 36' may be arranged substantially tangent to a cylinder which has the axis of pin 59 as its center axis; and thus the displacement of the center of generation of the surfaces 68 is adapted to give an increasing radius toward the right so that it wedges underneath the beveled surface 43 and holds the handle bars tightly in their upper position.

Furthermore, there is room for further rotation in the counterclockwise direction of the lever 56 (Fig. 2) as wear takes place at the surfaces 43, 68, and this stop lever 56 is adapted to take up wear and effect a tight wedging engagement with the lugs 40, 41.

The lugs 40, 41 are adapted to engage the upper stop surfaces 47, 48 in their uppermost position and are confined between the stop surfaces 47 and 68 and 48 and 68, respectively.

In order that the handle bars may also be latched in their folded position, the lever 56 is provided with a centrally located recess 69 located between the upper legs 65, 66 and provided with the outwardly beveled walls 70, 71. The depth of this recess 69 is sufficient to receive the handle bar lugs 40, 41, and the slope of the beveled walls 70, 71 in cooperation with the beveled surfaces 44 is so arranged that the handle bars are held in their lowermost position and urged toward each other in the position shown in Fig. 3 by the pressure of the plunger 49, but upon the application of a separating force to the two handle bars in the position of Fig. 3 the beveled surfaces 44 on the lugs 40, 41 cams against the beveled center 70, 71 and the walls of the recess 69, and urges the lever 56 clockwise in Fig. 2 against the pressure of the spring 50 until the lugs ride out of the recess 69 and over the face of the lever 56.

The handle bars may then be moved upward to the position of Fig. 1 until the lugs 40, 41 engage the stop surfaces 47, 48, which are also preferably suitably beveled to fit the surfaces 44.

Then the lever 56 is snapped outward underneath the lugs 40, 41 into wedging engagement with the surfaces 43 to hold the handle bars in their uppermost position.

The present folding handle bar construction is adapted to be operated more quickly than the devices of the prior art which employ threaded members for securing the handle bars in the open or the folded position, since the present latching devices are automatic in their operation and the handle bars may be opened by merely pulling upon the bars themselves.

The present construction is adapted to be used for a long period of time without possibility of rattling, as the latching arrangements contemplate the taking up of a suitable amount of wear, and the wedging engagement of the latching member with the wedging bars secures them firmly in either position without possibility of rattling.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In folding handle bars for bicycles, the combination of a steering post with a handle bar extension fixture carried by said steering post, a cylindrical member carried by said extension for movably supporting a pair of handle bars, a pair of handle bars, each handle bar having a fixture provided with a bearing mounted on said cylindrical member, said handle bar extension having a pair of upper stop members, and said handle bar fixtures each being provided with an axially projecting lug for engaging stop members when the handle bars are in the operative position, and latching means having a wedging latching surface engaging the opposite side of each of said lugs for holding the handle bars in the operative position.

2. In folding handle bars for bicycles, the combination of a steering post with a handle bar extension fixture carried by said steering post, a cylindrical member carried by said extension for movably supporting a pair of handle bars, a pair of handle bars, each handle bar having a fixture provided with a bearing mounted on said cylindrical member, said handle bar extension having a pair of upper stop members, and said handle bar fixtures each being provided with an axially projecting lug for engaging stop members when the handle bars are in the operative position, latching means having a wedging latching surface engaging the opposite side of each of said lugs for holding the handle bars in the operative position, and resilient means carried by said handle bar extension for engaging said latching means into latching engagement.

3. In folding handle bars for bicycles, the combination of a steering post with a handle bar extension fixture carried by said steering post, a cylindrical member carried by said extension for movably supporting a pair of handle bars, a pair of handle bars, each handle bar having a fixture provided with a bearing mounted on said cylindrical member, said handle bar extension having a pair of upper stop members, and said handle bar fixtures each being provided with an axially projecting lug for engaging stop members when the handle bars are in the operative position, latching means having a wedging latching surface engaging the opposite side of each of said lugs for holding the handle bars in the operative position, and resilient means carried by said handle bar extension for engaging said latching means into latching engagement, said resilient means comprising a spring pressed plunger formed with a tubular socket and provided with a spring located in said tubular socket.

4. In folding handle bars for bicycles, the combination of a steering post with a handle bar extension fixture carried by said steering post, a cylindrical member carried by said extension for movably supporting a pair of handle bars, a pair of handle bars, each handle bar having a fixture provided with a bearing mounted on said cylindrical member, said handle bar extension having a pair of upper stop members, and said handle bar fixtures each being provided with an axially projecting lug for engaging stop members when the handle bars are in the operative position, and latching means having a wedging latching surface engaging the opposite side of each of said lugs for holding the handle bars in the operative position, said latching means comprising a pivoted lever having its latching surface curved on a radius eccentric with respect to the axis of pivot of said lever.

5. In folding handle bars for bicycles, the combination of a steering post with a handle bar extension fixture carried by said steering post, a cylindrical member carried by said extension for movably supporting a pair of handle bars, a pair of handle bars, each handle bar having a fixture provided with a bearing mounted on said cylindrical member, said handle bar extension having a pair of upper stop members, and said handle bar fixtures each being provided with an axially projecting lug for engaging stop members when the handle bars are in the operative position, and latching means having a wedging latching surface engaging the opposite side of each of said lugs for holding the handle bars in the operative position, said latching means comprising a pivoted lever having its latching surface curved on a radius eccentric with respect to the axis of pivot of said lever, and resilient means carried by said handle bar extension for engaging said latching means into latching engagement.

6. In folding handle bars for bicycles, the combination of a steering post with a handle bar extension fixture carried by said steering post, a cylindrical member carried by said extension for movably supporting a pair of handle bars, a pair of handle bars, each handle bar having a fixture provided with a bearing mounted on said cylindrical member, said handle bar extension having a pair of upper stop members, and said handle bar fixtures each being provided with an axially projecting lug for engaging stop members when the handle bars are in the operative position, and latching means having a wedging latching surface engaging the opposite side of each of said lugs for holding the handle bars in the operative position, said latching means comprising a pivoted lever having its latching surface curved on a radius eccentric with respect to the axis of pivot of said lever, and resilient means carried by said handle bar extension for engaging said latching means into latching engagement, said resilient means comprising a spring pressed plunger formed with a tubular socket and provided with a spring located in said tubular socket.

7. In folding handle bars for bicycles, the combination of a steering post with a handle bar extension fixture carried by said steering post, a cylindrical member carried by said extension for movably supporting a pair of handle bars, a pair of handle bars, each handle bar having a fixture provided with a bearing mounted on said cylindrical member, said handle bar extension having a pair of upper stop members, and said handle bar fixtures each being provided with an axially projecting lug for engaging stop members when the handle bars are in the operative position, and latching means having a wedging latching surface engaging the opposite side of each of said lugs for holding the handle bars in the operative position, said latching means also including a latching recess for receiving said lugs and holding the handle bars in folded position.

8. In folding handle bars for bicycles, the combination of a steering post with a handle bar extension fixture carried by said steering post, a cylindrical member carried by said extension for movably supporting a pair of handle bars, a pair of handle bars, each handle bar having a fixture provided with a bearing mounted on said cylindrical member, said handle bar extension having a pair of upper stop members, and said handle bar fixtures each being provided with an axially projecting lug for engaging stop members when the handle bars are in the operative position, and latching means having a wedging latching surface engaging the opposite side of each of said lugs for holding the handle bars in the operative position, said latching means also including a latching recess for receiving said lugs and holding the handle bars in folded position, said latching recess being provided with beveled stop surfaces whereby the handle bars may be unlatched by application of an unfolding force to the handle bars.

9. In a folding handle bar mechanism, the combination of a steering post with a handle bar extension fixture carried by said steering post, said fixture being provided with a threaded bore, a threaded member having a cylindrical bearing surface and having an annular stop shoulder, threaded home in said bore, a pair of handle bars, each handle bar having a pivot fixture provided with a bearing portion mounted on said cylindrical portion of said threaded member, a head carried by said threaded member, and resilient means between said head and said bearing portions for holding the handle bars for rotation without rattling, said handle bar fixtures each having an axially extending stop lug, and latching means carried by said handle bar extension for holding the said axially extending lugs in fixed position, said latching means comprising a pivoted latching lever mounted on said handle bar extension, and resilient means for urging said pivoted latching lever into latching position.

10. In a folding handle bar mechanism, the combination of a steering post with a handle bar extension fixture carried by said steering post, said fixture being provided with a threaded bore, a threaded member having a cylindrical bearing surface and having an annular stop shoulder, threaded home in said bore, a pair of handle bars, each handle bar having a pivot fixture provided with a bearing portion mounted on said cylindrical portion of said threaded member, a head carried by said threaded member, and resilient means between said head and said bearing portions for holding the handle bars for rotation without rattling, said handle bar fixtures each having an axially extending stop lug, and latching means carried by said handle bar extension for holding the said axially extending lugs in fixed position, said latching means comprising a pivoted latching lever mounted on said handle bar extension, and resilient means for urging said pivoted latching lever into latching position, said latching lever being provided with a centrally located recess having lateral stop surfaces for receiving said lugs and holding said handle bars in the folded position.

11. In a folding handle bar mechanism, the combination of a steering post with a handle bar extension fixture carried by said steering post, said fixture being provided with a threaded bore, a threaded member having a cylindrical bearing surface and having an annular stop shoulder, threaded home in said bore, a pair of handle bars, each handle bar having a pivot fixture provided with a bearing portion mounted on said cylindrical portion of said threaded member, a head carried by said threaded member, and resilient means between said head and said bearing portions for holding the handle bars for rotation without rattling, said handle bar fixtures each having an axially extending stop lug, and latching means carried by said handle bar extension for holding the said axially extending lugs in fixed position, said latching means comprising a pivoted latching lever mounted on said handle bar extension, and resilient means for urging said pivoted latching lever into latching position, said latching lever being provided with a centrally located recess having lateral stop surfaces for receiving said lugs and holding said handle bars in the folded position, said lugs and lateral stop surfaces being formed with a bevel whereby an opening force on the handle bars cams the latching lever from the latching position.

12. In a folding handle bar mechanism, the combination of a steering post with a handle bar extension fixture carried by said steering post, said fixture being provided with a threaded bore, a threaded member having a cylindrical bearing surface and having an annular stop shoulder, threaded home in said bore, a pair of handle bars, each handle bar having a pivot fixture provided with a bearing portion mounted on said cylindrical portion of said threaded member, a head carried by said threaded member, and resilient means between said head and said bearing portions for holding the handle bars for rotation without rattling, said handle bar fixtures each having an axially extending stop lug, and latching means carried by said handle bar extension for holding the said axially extending lugs in fixed position, said latching means comprising a pivoted latching lever mounted on said handle bar extension, and resilient means for urging said pivoted latching lever into latching position, said latching lever being provided with a wedging latching surface curved on a predetermined radius and with respect to a center that is eccentric with regard to the pivotal axis of the lever.

FRANK W. SCHWINN.